May 3, 1966  J. J. SCOTT  3,249,143
TRACTION DEVICE

Filed Sept. 14, 1964  3 Sheets-Sheet 1

INVENTOR
John J. Scott

BY Connolly and Hutz
ATTORNEYS

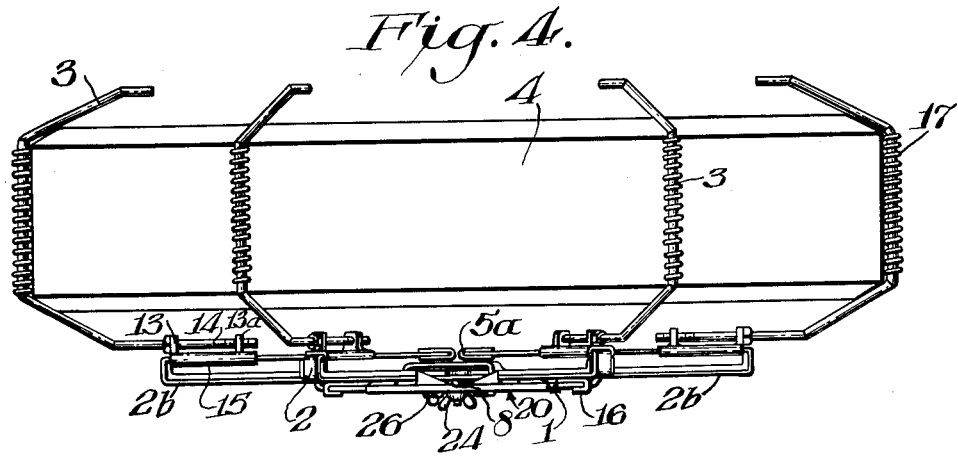
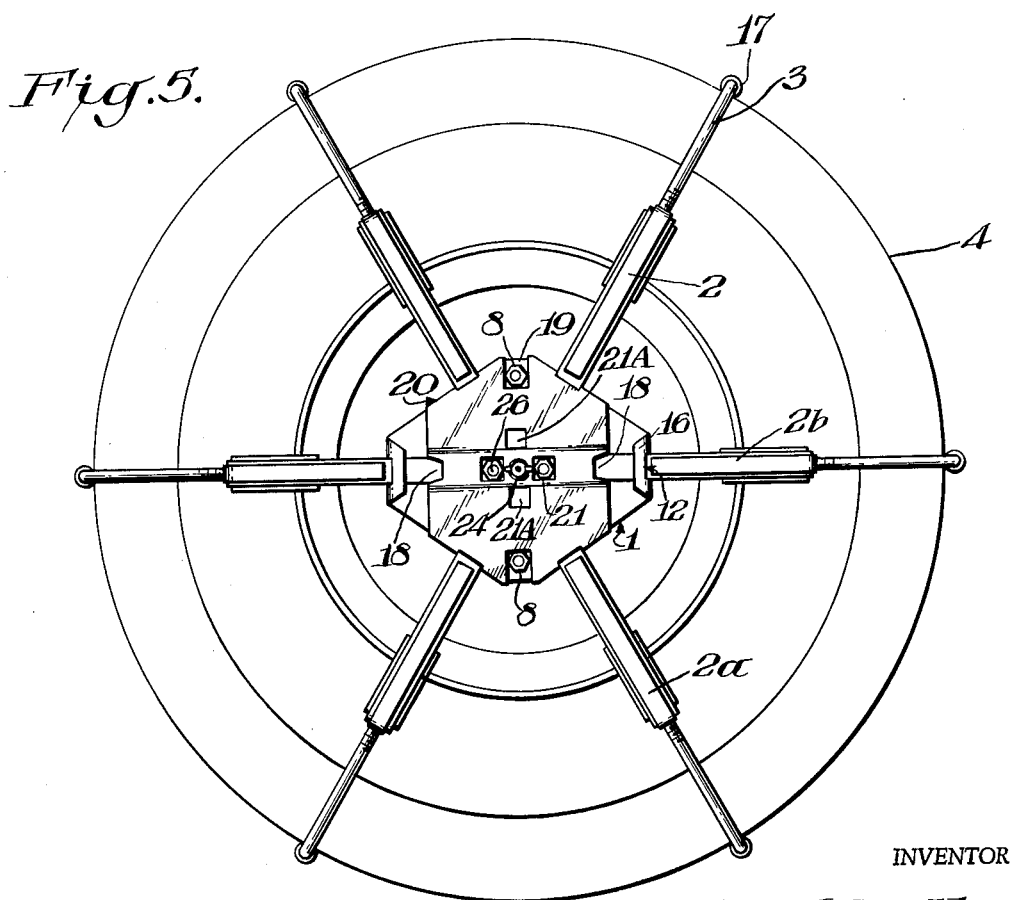

May 3, 1966 J. J. SCOTT 3,249,143
TRACTION DEVICE
Filed Sept. 14, 1964 3 Sheets-Sheet 3
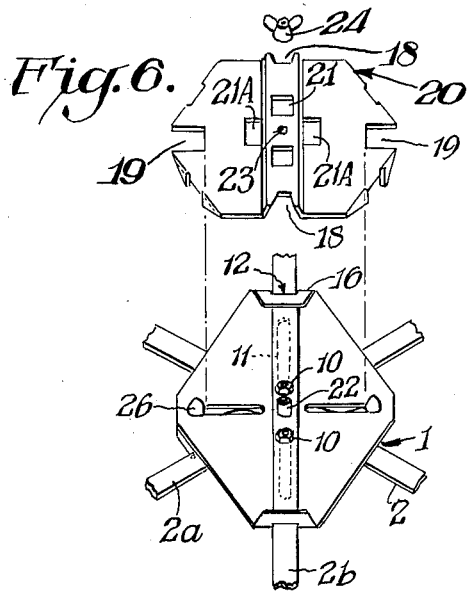
Fig. 6.
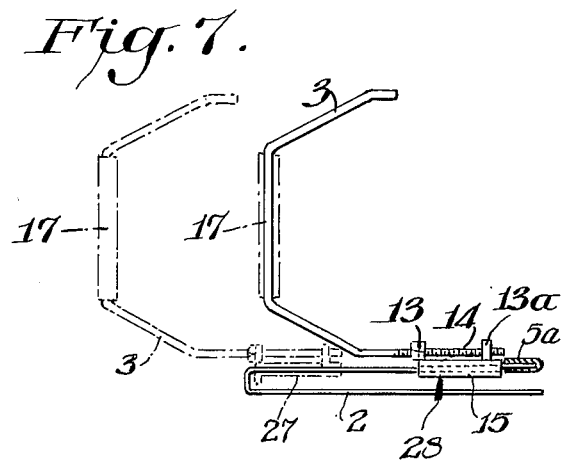
Fig. 7.
Fig. 8.
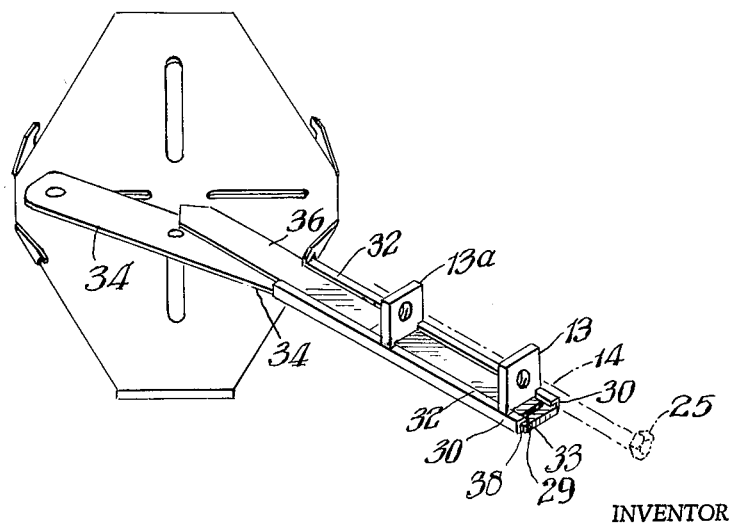
INVENTOR
John J. Scott
BY Connolly and Hutz
ATTORNEYS 3,249,143
TRACTION DEVICE
John J. Scott, 2395 Limestone Road, Wilmington, Del.
Filed Sept. 14, 1964, Ser. No. 396,134
6 Claims. (Cl. 152—225)

The present invention relates to a traction device capable of easy installation on and removal from the ground-engaging wheel of a vehicle. It is especially useful on those wheels which are equipped with pneumatic tires and is designed to effectively improve traction in snow, ice, mud, sand, etc.

A particular advantage of the present invention resides in the fact that it may be quickly and easily applied to a wheel from the outer side without first jacking up the vehicle. Additionally, the number of parts which must be assembled and disassembled for use after the first initial adjustments are made, are extremely limited in number. This permits the apparatus to be put on and removed from the wheel with considerable ease.

In a preferred embodiment particularly designed for use with pneumatic tires, the traction elements are independently capable of receding towards the axis of the wheel to compensate for partial collapse of the pneumatic tire due to uneven road surfaces and even to compensate for total collapse of the tire in the case of a flat tire.

Other objects and advantages of the present invention will be readily apparent to those skilled in the art from a consideration of the detailed description which follows, particularly when taken in connection with accompanying drawings wherein specific embodiments of the present invention are illustrated. However, it is obvious that the invention is not limited to the specific details disclosed but includes the full range of equivalents falling within the spirit of the invention and the scope of the appended claims.

In the drawings:

FIGURE 4 is a plan view showing traction device in engagement with tire with locking plate in position.

FIGURE 5 is a right side elevation of arms radially adjusted to engage tire with locking plate in position to retain arms positioned.

FIGURE 6 is an exploded view showing locking plate which retains arms radially positioned.

FIGURE 7 is a segmental view showing traction element at both limits of radial motion.

FIGURE 8 is a modification of FIGURE 2, showing a preferred embodiment of radially-compensating means.

Figure 1:
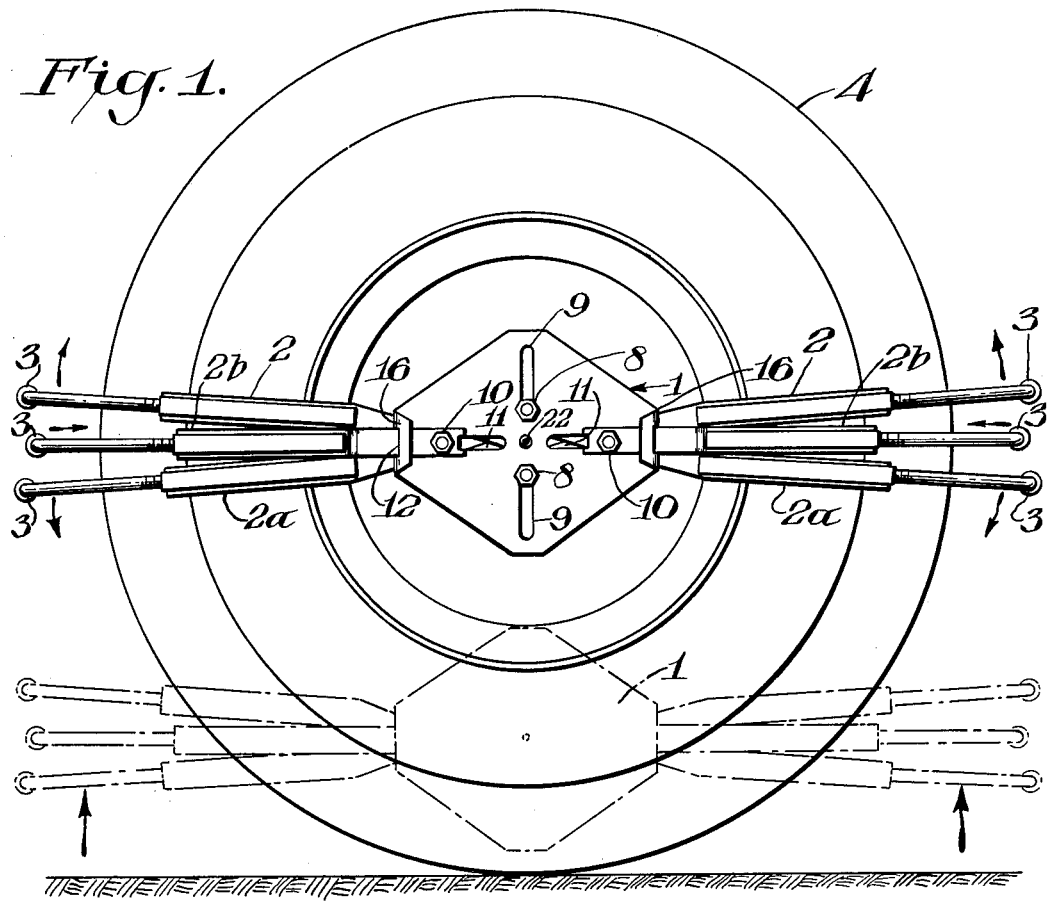
FIGURE 1 is a right side elevation of traction device shown closed in proper position for arms to properly grip tire. Phantom view shows initial position of traction device to slide around on tire.
Figure 2:
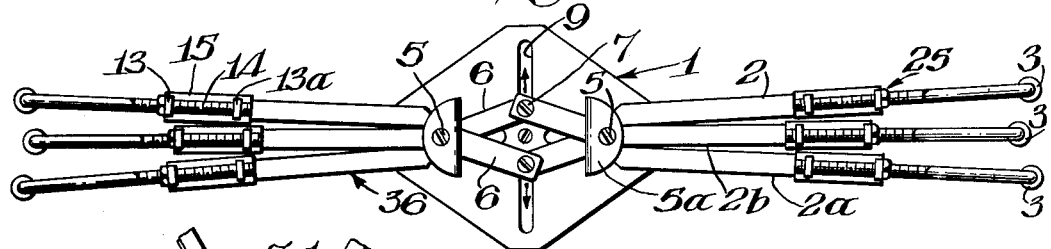
FIGURE 2 is left side elevation of traction device.
Figure 3:
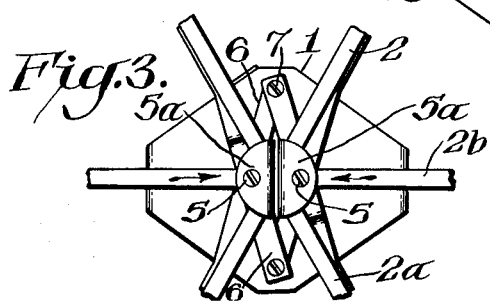
FIGURE 3 is left side elevation showing relative position of arms in expanded condition and an alternative arrangement of the arms.

Referring to the drawings, the traction device of the present invention according to the exemplary embodiments illustrated in FIGURE 1 comprises in combination a central spanner plate 1 adapted to overlie the axis of rotation of the wheel, a pair of three extension members 2, 2a and 2b extending generally radially from opposite sides of the spanner plate 1, a generally axially directed traction element 3 connected to the extension members 2, 2a and 2b and designed to increase the traction between the outer peripheral surface 4 of the wheel and the ground, and mechanical linkage means for coordinating the movement of extension members 2, 2a and 2b, illustrated in more detail in FIGURES 2 and 3.

The mechanical linkage means includes, for example, pivot means 5 for connecting extension members 2, 2a and 2b with spanner plate 1. Pivot means 5 can be mounted through half-moon plate 5a to provide additional support when extension arms 2, 2a and 2b are in expanded position as illustrated in FIGURE 3. However, plate 5a is not essential, particularly when extension arms 2, 2a and 2b are modified as in FIGURE 8. Pivot means 5 is associated with extension 6 of extension members 2 and 2a. Two extension members 6 from each pair of extension members 2 or 2a form a scissors linkage arrangement with the common pivot 5. The inner ends of each scissors arrangement are joined with the alternate inner end of the opposite scissors arrangement. This is preferably accomplished by securing means such as a bolt 7 and nut 8 arrangement wherein bolt 7 protrudes through an elongated opening 9 in spanner plate 1 and nut 8 is designed to provide bolt 7 with means for overlapping spanner plate 1 on either side of opening 9, thus providing the scissors arrangement 6 with means for relative shifting in unison between two limits of motion.

Pivot 5 in turn may be a bolt arrangement passing through spanner plate 1 having a securing nut 10 on the opposite side of spanner plate 1. In this event spanner plate 1 is provided with openings 11 which extend along an axis passing through the central point of spanner plate 1 and at an angle of approximately 90° to an imaginary line passing through the center of openings 9 and through the center of spanner plate 1. In the first limit of motion, bolt 7 and nut 8 approach the axis of the assembly along opening 9 and position the pairs of extension members on each side generally together in essentially parallel relationship as illustrated in FIGURE 1. In the second limit of motion, bolt 7 and nut 8 approach the opposite end of opening 9 and position the pairs of extension members in expanded position; at the same time, this draws the traction elements 3 towards the axis so that in expanded position said traction elements are substantially in contact with the peripheral surface 4. The extension members 2 and 2a are then away from one another in angled relationship as illustrated in FIGURES 3, 4 and 5. FIGURES 4 and 7 additionally illustrate the possibility of using a variety of tread designs 17 to improve traction under varying conditions.

FIGURE 2 illustrates means for adjusting the length of extension members 2, 2a and 2b by providing a degree of overlap between elements of said extension members and traction element 3. For example, the extension members 2, 2a and 2b can be provided with slidable sections 15 on which are mounted nuts 13 and 13a designed to receive thread portion 14 of traction element 3. In this manner the overall length of extension members 2, 2a and 2b and traction element 3 from the center of the spanner plate 1 can be adjusted to compensate for wheels of different diameters.

Nuts 13 and 13a are preferably mounted on a slidable section 15 designed to move back and forth over the length of radial section 36 of extension members 2, 2a and 2b from the center of spanner plate 1 to the extremities of said extension members as more clearly illustrated in FIGURE 8.

Lock nuts 25 are located on the threaded portions 14 of traction elements 3 and are tightened up against nuts 13 to secure traction elements 3 in position after adjustment to compensate for the radius of the wheel.

Spanner plate 1 preferably contains supporting elements 16 (FIGURE 1) on opposing sides of said spanner plate 1 for a third extension member 2b mounted between extension members 2 and 2a. As illustrated the support can be a folded flap of spanner plate 1 provided with an appropriately located opening 12 slightly larger than the width and thickness of extension member 2b. This allows extension member 2b to be formed from two flaps in the portion nearest the axis of the assembly, the front flap passing through opening 12 to pivot bolt 5 and the rear flap continuing directly to pivot bolt 5. Pivot bolt 5 and nut 10 are designed to secure the two flaps in such a manner that extension members 2b will readily slide outwardly and inwardly over spanner plate 1 with pivot bolt 5 moving within the confines of elongated openings 11.

A locking plate more particularly illustrated in FIGURE 6 is provided to keep the extension members in the second limiting position, i.e., away from one another. In one embodiment the plate will be provided with recesses 18 into which nuts 10 will lodge in closed (storage) position. It additionally will contain recesses 19 for nuts 8 which in the open position are further from the center of spanner plate 1 than in the closed position. Locking plate 20 as illustrated in FIGURE 6 is additionally provided with openings 21 in which nuts 10 will fit when the traction device is in the open position. Locking plate 20 is also additionally provided with openings 21a in which nuts 8 will fit when the device is in the closed (storage) position. In both open and closed position locking plate 20 is secured to spanner plate 1 by means of standard securing equipment. As illustrated in FIGURE 6 this can be provided by a centrally located bolt 22 in spanner plate 1 extending outwardly through a corresponding opening 23 in locking plate 20 and a nut or wing nut 24. Use of nuts with domed heads 26 (FIGURE 6) is advantageous in facilitating the correct positioning of locking plate 20. The rounded surfaces allow locking plate 20 to force head 26 and, in turn extension members 2, 2a and 2b, into the various limits of motion. This feature is particularly desirable at the second limit of motion.

In FIGURE 8, one piece of metal is used to form arm radial 36, groove 38 and radially compensating means 34. Radially compensating means 34 insures radial arms 36 of extension members 2 and 2a are properly spaced and are positioned along an imaginary line coinciding with the radius of the wheel. Side pieces 30 and flaps 32 are integral parts of extension members 2, 2a and 2b. Between radial arm 36 and flaps 32, groove 38 is provided to allow slidable section 15 to slide back and forth, thus in turn allowing traction element 3 through its thread portion 14 to adjust radially when the peripheral surface of the wheel is compressed. Slidable section 15 is illustrated at approximately the limit of outward travel where the underfolded flaps at its outer end 29 are about to come in contact with fold 33 formed at the junction of radially compensating means 34 and radial arm 36.

Radial arm 36 protrudes through slidable section 15 in such a manner that the slidable section readily moves within groove 38 from the outer end of radial arm 36 inwardly, allowing for the partial collapse of the tire on a moving wheel. In FIGURE 7, slidable section 15 is shown in normal position 27 in relation to extension member 2. Additionally, it is shown in position 28 illustrating the second limit of radial motion.

Reference to the drawings will show that mounting of this device on the wheel of a vehicle is a relatively simple matter. The device is placed alongside a tire at the lower limits as indicated by the phantom view at the bottom of FIGURE 1. It is then raised in position so that the center spanner plate overlies the axis of rotation in the wheel and the traction elements 3 extend beyond the circumference of the tire. By grasping the upper extension members on either side and pulling them upwardly the upper and lower extension members shift in unison to the second limit of motion as illustrated in FIGURE 5. By means of the linkage device such as illustrated in FIGURE 2 the extension members at the second limit of motion are so adjusted that the axially directed traction elements are now in contact with the tire circumference at evenly spaced points. The assembly is then kept in place by means of locking plate 20 such as illustrated in FIGURES 5 and 6. The locking plate is secured to the traction device, for example, by means of a wing nut and bolt assembly as previously described.

Removal of the device from the tire is equally simple. The locking plate 20 is removed by unscrewing wing nut 24 or other securing means and lifting the plate off. Then by pushing downward on upper extension members 2 the entire device collapses on itself and falls from the wheel so that it may be removed easily at a point usually below the horizontal diameter of the wheel.

I claim:
1. A traction device for installation on the ground-engaging wheel of a vehicle comprising in combination:
a central spanner plate adapted to overlie the axis of rotation of the wheel,
three extension members extending generally radially from two opposite sides of the spanner plate,
a generally axially directed traction element connected to each extension member to increase traction between the outer peripheral surface of the wheel and the ground upon rotation of the wheel about its axis, and
mechanical linkage means connecting the extension members with the spanner plate for relative predetermined shifting in unison between two limits of motion, the first limit positioning each group of three extension members on each side generally together in essentially parallel relationship and simultaneously positioning the traction elements a distance from the center of the spanner plate which is greater than the radius of the wheel, and the second limit positioning each group of three extension members on each side away from one another in angled relationship and simultaneously positioning the traction elements a distance from the center of the spanner plate which corresponds with the radius of the wheel, and means for locking the extension members at the second limit.

2. A traction device for installation on the ground-engaging wheel of a vehicle as in claim 1 wherein the extension members include a means for semi-permanent adjustment of the maximum distance of the traction element from the center of the spanner plate.

3. A traction device for installation on the ground-engaging wheel of a vehicle as in claim 1 wherein the traction element includes an axially directed portion adapted to overlie the outer peripheral surface of the wheel as well as a radially inwardly directed element adapted to engage the wheel on a side opposite the location of the spanner plate, and wherein the axially directed portion of the traction element further includes an irregularly contoured gripping surface.

4. A traction device for installation on the ground-engaging wheel of a vehicle as in claim 1 wherein the three extension members on each side of the spanner plate include means connected to permit generally radial motion of the traction elements within predetermined limits whereby the traction device is self-compensating with respect to a flexible peripheral surface of the wheel.

5. A traction device for installation on the ground-engaging wheel of a vehicle as in claim 1, wherein the three extension members on each side of the spanner plate are mounted for shifting in unison about a common pivot axis, and the mechanical linkage means includes a scissors linkage arrangement connected to shift the two common pivot axes toward and from each other as the extension members shift in unison between the two limits of motion.

6. A traction device for installation on the ground-engaging wheel of a vehicle as in claim 5 wherein the mechanical linkage means positions the extension members radially relative to the axis of rotation of the wheel at the second limit.

References Cited by the Examiner
UNITED STATES PATENTS

| | | | |
|---|---|---|---|
| 2,596,517 | 5/1952 | Allen | 152—225 |
| 2,744,558 | 5/1956 | Ciavola | 152—228 |
| 3,019,830 | 2/1962 | Shelby | 152—225 |

ARTHUR L. LA POINT, *Primary Examiner.*

EUGENE G. BOTZ, *Examiner.*

C. W. HAEFELE, *Assistant Examiner.*